United States Patent [19]

Hindin et al.

[11] 3,966,790

[45] June 29, 1976

[54] COMPOSITIONS AND METHODS FOR HIGH TEMPERATURE STABLE CATALYSTS

[75] Inventors: Saul G. Hindin, Mendham; George R. Pond, Elizabeth, both of N.J.

[73] Assignee: Engelhard Minerals & Chemicals Corporation, Murray Hill, N.J.

[22] Filed: Dec. 10, 1973

[21] Appl. No.: 423,094

[52] U.S. Cl............................ 252/465; 252/466 PT
[51] Int. Cl.$^2$.......................................... B01J 23/16
[58] Field of Search....................... 252/465, 466 PT

[56] References Cited
UNITED STATES PATENTS

| | | | |
|---|---|---|---|
| 2,742,437 | 4/1956 | Houdry............................ | 252/465 X |
| 3,002,920 | 10/1961 | Porter et al................ | 252/466 PT X |
| 3,360,330 | 12/1967 | Hoekstra................................. | 23/2 |
| 3,679,768 | 7/1972 | Kmecak et al.................. | 252/465 X |
| 3,686,340 | 7/1972 | Patrick et al.............. | 252/466 PT X |
| 3,692,863 | 9/1972 | Kmecak et al.................. | 252/465 X |
| 3,694,348 | 9/1972 | Bursian et al............ | 252/466 PT X |

*Primary Examiner*—Paul F. Shaver

[57] ABSTRACT

Catalysts having good high temperature stability which are particularly useful for selected high temperature reactions are disclosed as are methods for their preparation and use. The catalytically-active materials include platinum group metal deposited on a catalytic slip or composite which contains a mixture of alumina, selected VIB metal oxides, and a metallic oxide or oxide mixture wherein the metal or metals are selected IIA, IVA, and IIA-IVA mixtures, selected IIA and IVB mixtures and selected IVA and IVB mixtures. The slips or carrier compositions are calcined at a temperature of at least 500°C. before deposition of platinum group metal and characterized by having a surface area of at least 20 m$^2$g after calcination at a temperature of 1200°C. for two hours.

20 Claims, No Drawings

COMPOSITIONS AND METHODS FOR HIGH TEMPERATURE STABLE CATALYSTS

The present invention relates to catalyst compositions and methods for their preparation and use. In particular, this invention relates to catalyst compositions characterized by high stability thereby maintaining good catalytic activity.

Catalyst compositions exhibit a relatively high surface area per unit weight to allow the largest amount of reactants to contact the catalyst. Additionally, high surface area is important when the catalyst composition contains a precious metal such as platinum because of the cost of the metal and because of the dispersion required to prevent undue metal crystallite growth. It is desirable to retain this high surface area for long periods of use under severe conditions which might include reaction temperatures of 1200°C. or higher.

Alumina is an excellent and relatively economical carrier or support for many catalysts. Many crystalline forms of alumina, for example, chi, kappa, gamma, delta, eta, and theta, exhibit a very high surface area in relation to their weight. A serious drawback of alumina as a catalyst carrier, however, is its transition temperature of about 1000°–1200°C. to the alpha form which results in a substantial reduction of the surface area. It is thus extremely desirable to stabilize alumina-containing catalyst compositions based on high surface area aluminas to substantially prevent the transition to the low surface alpha form with a consequent loss in activity.

It is therefore an object of this invention to provide catalyst compositions, as well as methods for their preparation and use, which exhibit high temperature stability. Other objects and advantages will appear as the description proceeds.

Broadly, the catalyst composition of this invention includes a catalytically-active, calcined composite characterized by a surface area of at least 20 square meters per gram ($m^2/g$) after calcination for two hours at a temperature of 1200°C., said composite comprising or being a composite of alumina, selected Group VIB oxides and a metal oxide wherein the metal is selected from the group consisting of selected IIA and IVA metals and mixtures thereof, selected IIA and IVB mixtures and selected IVA and IVB mixtures. In preparing the catalyst composition, the composite is first calcined at a temperature of at least 500°C. and then a catalytically-effective amount of a platinum group metal is added to the composite. A catalyst composition prepared in accordance with this invention exhibits high temperature stability and therefore catalytic activity in a number of high temperature reactions, particularly high temperature combustion reactions.

The composite is formed by the calcination of an intimate admixture of an aluminum compound, a chromium and/or tungsten compound and a metal compound wherein the metal is selected from the group consisting of calcium, barium, strontium, and mixtures thereof, mixtures of calcium, barium, and strontium with silcon and tin and mixtures of silicon and tin with zirconium. Preferably, for certain methods of preparation, the aluminum compound is alumina. These compounds, as indicated, if not already in oxide form must be capable of forming or yielding their respective oxides upon calcination in air (oxygen) at a temperature of at least 500°C. The combination of the chromium and/or tungsten oxide and the other metal oxide or oxides may be considered as a high temperature stabilizing component for the alumina.

The relative amounts of alumina to the metal oxide stabilizing component, that is, the Cr and/or W oxide and oxides of the selected metal combinations of Groups IIA, IVA, and IVB are governed largely by empirical criteria. While it is not desired that this invention be limited by the following theory, a brief statement may provide a helpful framework to further elucidate the invention. It is thought that the addition of the stabilizing component to the alumina or alumina precursor and calcination of the mixture at a temperature of at least 500°C. converts any of the non-oxide compounds to oxides and allows the stabilizing component oxides to enter the alumina lattice and prevent or substantially reduce subsequent transition to alpha alumina.

All surface areas throughout the specification and the appended claims are measured by the B.E.T. or equivalent method. The terminology used to describe the metals herein, that is, the Group IIA, IVA, and IVB metals is the terminology used in association with the common long form of the Periodic Table of Elements. Thus Group IVB metals are titanium, zirconium, hafnium, and thorium Group IIA metals are beryllium, magnesium, calcium, strontium, and barium, and the Group VIB metals are chromium, molybdenum, and tungsten.

The catalyst composition may also contain a minor amount of other ingredients, up to about 5 percent by weight of the composite, which may serve as promoters, activators, or other purposes, for oxidation or reduction reactions. Such ingredients may include, for example, manganese, vanadium, copper, iron, cobalt, and nickel usually as the metal oxide or sulfide.

The calcined composite may be formed to any desired shape such as a powder, beads, or pellets. This shaping or fabricating is accomplished before calcination to promote particle adhesion. After calcination, a platinum group metal is added to the composite. Additionally, the composite can be applied or deposited on a relatively inert support or substrate and the platinum group metal then added, or the catalyst composition can be applied or deposited onto the inert support.

For compositions made in accordance with this invention, the composite generally comprises about 80 to 95 weight percent alumina. The chromium and tungsten oxides may be present either alone or mixed in about 2 to 15 weight percent preferably about 5 to 15 weight percent of the composite. The calcium, strontium, and barium oxides whether alone or mixed may be present in about 2 to 15 weight percent, preferably 5 to 15 weight percent of the composite. The silicon or tin oxides whether alone or mixed may be present in about 2 to 15 weight percent, preferably 5 to 15 weight percent of the composite. The zirconium oxide, may be present in about 2 to 15 weight percent of the composite, preferably about 5 to 15 weight percent. The stabilizing component combination may be present in about 5 to 20 weight percent, preferably about 5 to 15 weight percent of the composite. If the amount of alumina is too low, the resulting composite will not provide enough surface area to provide catalytic activity. If more alumina is present than stated, it may not be stabilized sufficiently and will lose surface area in the transition to the alpha form.

Generally, to provide the advantages of this invention, it is necessary for the stabilizing component to be in intimate association with the alumina during pre-calcining. An intimate admixture may be achieved, for example, by forming a slurry of alumina with water soluble or water dispersible compounds of the stabilizing components. Where desired, hydrated alumina, such as aluminum trihydrate is admixed with aqueous solutions of chromium and/or tungsten metal salt and at least one of the other metal salts or metal salt combinations of this invention to permit sorption of the stabilizing components by the alumina. The solids are then recovered from the slurry and calcined to provide the mixed oxide composite. The particulate alumina is preferably in finely divided or colloidal form to provide maximum sorption area. For example, finely divided freshly precipitated aluminum trihydrate having a particle size of 70 percent to 90 percent smaller than 325 mesh is useful. When large particle size alumina is used, the sorption of the stabilizing components from solution and subsequent calcination will provide at least a stabilized outer portion of the alumina.

Another method of preparing intimate admixture of alumina and stabilizing components is to coprecipitate all of the components, including the alumina, from aqueous solutions. Various methods of coprecipitation are suitable. Such methods include, for example, surface adsorption where one or more components in ionic form are sorbed on the surface of a precipitating solid; and inclusion, in which the coprecipitated compound or compounds have dimensions and a chemical composition which will fit into the crystal structure of a precipitating solid without causing appreciable distortion.

In coprecipitation, suitable precipitant, usually a base, is added to an aqueous solution of the compounds. This can also be done by concurrent addition of both the precipitant and the compound solution to a vessel containing water. Preferably the precipitant is selected such that undesirable or unnecessary compounds are volatilizable and decomposable upon calcination at 500°C. or above, or removable by washing or extraction. The precipitant is capable of initiating and completing essentially simultaneous coprecipitation of the components. Suitable precipitants are ammonium compounds such as ammonium hydroxide or ammonium carbonate as well as other hydroxides and carbonates of the alkali metals.

The precipitant may be in dilute or concentrated aqueous solution. The rapidity of addition of the precipitant and the degree of agitation used will vary depending upon the precipitate desired. Dilute precipitant solutions, slow addition, and vigorous agitation generally favor a coarser precipitate. The temperature during the addition of precipitant may be from about 0° to 90°C. Higher temperatures generally produce a coarser precipitate. The precipitant is added until a pH of about 5 to 9.0 is reached. At this time the coprecipitated mixture is recovered from the slurry, washed if desired, and digested or recrystallized if desired.

The intimate admixture of alumina and stabilizing components are calcined at a temperature of at least about 500°C., preferably about 900° to 1200°C., but not at such a high temperature or for such a long period of time to unduly sinter the composite. The conditions of the calcination are such as to provide a catalytically-active composite having a relatively high surface area of at least about 25 square meters per gram, and preferably at least about 75. Calcination is preferably conducted while the admixture is unsupported and in free-flowing condition. This is preferable for economic reasons and to prevent undue sintering.

Calcination in air to form the composite, and prior to the addition of a platinum group metal, is an integral part of the subject invention. It is found that an intimate admixture of the stabilizing components and the alumina is stable when calcined at such temperatures before any further preparative steps are performed. Since both the alumina and the stabilizing components are intimately admixed, the concurrent heating in close association substantially reduces any undesirable alumina transitions. Additionally, calcination before deposit on an inert substrate promotes adhesion of the calcined composite to the substrate thus allowing the use of higher space velocities with the finished catalyst composition with less chance of erosion. Further, calcination substantially reduces the possibility of reaction of the stabilizing component and alumina component with the substrate. Any such reactions between the alumina and the substrate promotes the formation of inactive forms of alumina thereby reducing its surface area and activity. If the stabilizing component were to react with the substrate, it would reduce the effective amount of this component available for stabilization. A further advantage of such calcination is economic because less heat in smaller furnaces is required to calcine the resulting powder composite before it is placed on an inert support. Further, it is essential that the calcination is conducted before the addition of a platinum group metal component to prevent loss of such component by occlusion.

Suitable aluminum-containing compounds are alumina, the gamma, eta, kappa, delta, and theta forms of alumina and for coprecipitation, the water soluble aluminum compounds such as salts, for example, the aluminum halides, aluminum nitrate, aluminum acetate, and aluminum sulfate.

The Group IVB metal oxides applicable, i.e., the oxide of zirconium, is added to the alumina in the form of its water soluble precursor. Thus, for example, suitable water soluble zirconium salts are zirconyl nitrate, $Zr(NO_3)_4$, $ZrCl_4$, $Zr(SO_4)_2$, and $ZrOCl_2$.

Water soluble compounds of chromium and tungsten which can be used are, for example, chromium acetate, chromium nitrate, chromium halides, chromium oxide (chromic acid), chromium oxalate, and complexes of chromium such as chloropentamine chromium chloride, tungsten halides, tungsten oxy-salts, such as tungsten dioxydichloride, ammonium tungstate, and the like.

Suitable Group IVA compounds are compounds of silicon and tin including water soluble salts and organic complexes as well as certain dispersible compounds. The halides and sulfates of tin are useful as well as certain dispersions of high surface area, low sodium, colloidal silica having a very small particle size, for example, a product marketed by Du Pont de Nemours & Co., under the registered Trademark Ludox LS is particularly suitable. This silica sol contains about 30 percent by weight $SiO_2$ in water, has a particle size of about 15 millimicrons, a 285 $SiO_2$ to $Na_2O$ ratio and a surface area of about 200 m²/g.

A platinum group metal is added to the calcined composite to form the catalyst compositions of this invention, which are found to be effective for long time high temperature reactions. Such metals are usually added or incorporated in amounts sufficient to provide significant activity. The platinum group metals useful are platinum, ruthenium, palladium, iridium, and rhodium. The choice of metal, metal combinations or alloys is governed largely by activity, specificity, volatility, deactivation by specific components included with the reactants, and economics.

The quantity of platinum group metal added to the calcined composite depends first on design requirements such as activity and life and second on economics. Theoretically, the maximum amount of such metal is enough to cover the maximum amount of surface available without causing undue metal crystallite growth and loss of activity during use. Two major competing phenomena are involved in such surface treatment. It is desirable to completely cover the substrate surface to provide the greatest amount of platinum group metal coverage, thereby obtaining maximum activity, but if the surface were to be completely covered, such coverage would promote growth between adjacent crystallites, which growth would then decrease the surface area and greatly reduce activity. A balance of maximum coverage coupled with proper dispersion thus must be achieved to formulate a practical catalyst. An ancillary consideration in relation to the amount of platinum group metal is the allowable size of the catalyst housing. If the size is small, the amount of platinum group metal component used is preferably increased within the above-described limits. For example, for automobile exhaust treatment, the allowable size is relatively small, especially if unitary honeycomb type supports are used and a higher loading may be desirable. Economics, of course, dictates the use of the least amount of platinum group metal component possible while accomplishing the main objective of promoting the reaction. Generally, the amount of platinum group metal used is a minor portion of the catalyst composite and typically does not exceed about 20 weight percent of the calcined composite. The amount may be about 0.1 to 20 percent and is preferably about 0.2 to 10 percent to economically maintain good activity with prolonged use. These percentages are based on the weight of the calcined composite. If the composite is used on an inert substrate, the composite may be, for example, about 10 percent of the weight of the substrate and the percent weight of platinum group metal in relation to the total weight of substrate and composite will be correspondingly less.

During preparation of the catalyst composition, various compounds and/or complexes as well as elemental dispersions of any of the platinum group metals may be used to achieve deposition of the metal on the composite. Water soluble platinum group metal compounds or complexes may be used. The platinum group metal may be precipitated from solution, for example, as a sulfide by contact with hydrogen sulfide. The only limitation on the carrier liquids is that the liquids should not react with the platinum group metal compound and be removable by volatilization or decomposition upon subsequent heating and/or vacuum, which may be accomplished as part of the preparation or in the use of the completed catalyst composition. Suitable platinum group metal compounds are, for example, chloroplatinic acid, potassium platinum chloride, ammonium platinum thiocyanate, platinum tetrammine hydroxide, platinum group metal chlorides, oxides, sulfides, and nitrates, platinum tetrammine chloride, palladium tetrammine chloride, sodium palladium chloride, hexammine rhodium chloride, and hexammine iridium chloride. If a mixture of platinum and palladium is desired, the platinum and palladium may be in water soluble form, for example, as ammine hydroxides or they may be present as chloroplatinic acid and palladium nitrate when used in preparing the catalyst of the present invention. The platinum group metal may be present in the catalyst composition in elemental or combined forms, e.g., as an oxide or sulfide. During subsequent treatment such as by calcining or upon use, essentially all of the platinum group metal is converted to the elemental form.

While these catalyst compositions are useful in many reactions, they are not necessarily equivalent in all processes nor are those which are useful in the same process necessarily exactly equivalent to each other.

While it is not essential, the catalyst compositions of this invention preferably have a relatively catalytically-inert support or substrate. The supports which can be employed in this invention are preferably unitary, skeletal structures of relatively large size, e.g., honeycombs. However, smaller particle forms may be used, e.g., pellets or spheres. The size of these pellets can be altered depending upon the system, its design and operating parameters in which they are to be used, but may range from about 1/64 to ½ inch, preferably 1/32 to ¼ inch, in diameter; and their lengths are about 1/64 to 1 inch, preferably about 1/32 to ¼ inch.

When a support is used, the calcined composite is generally present in a minor amount of the total catalyst composition, which is usually about 2 to 30 weight percent preferably about 5 to 20 weight percent, based on the total weight of the composite and support. The amount used depends on economics, size limitations, and design characteristics.

These supports whether of the unitary-skeletal type or pellets are preferably constructed of a substantially inert, rigid material capable of maintaining its shape and strength at high temperatures, for example, up to about 1800°C. The support typically has a low thermal coefficient of expansion, good thermal shock resistance, and low thermal conductivity. While a support having a porous surface is preferred, the surface may be relatively non-porous, but in such event it is desirable to roughen the surface to improve adhesion of deposited compositions.

The support may be metallic or ceramic in nature or a combination thereof. The preferred supports, whether in skeletal or other form, are composed primarily of refractory metal oxide including combined oxide forms, e.g., aluminosilicates. Suitable support materials include cordierite, cordierite-alpha alumina, silicon nitride, silicon carbide, zircon-mullite, spodumene, alumina-silica-magnesia, and zirconium silicate. Examples of other suitable refractory ceramic materials are sillimanite, magnesium silicates, zircon, petalite, alpha-alumina, and aluminosilicates. Although the support may be a glass ceramic, it is preferably unglazed and may be essentially entirely crystalline in form and marked by the absence of any significant amount of glassy or amorphous matrices. Further, the structure may have considerably accessible porosity, preferably having a water pore volume of at least about 10 percent. Such supports are described in U.S. Pat. No. 3,565,830, herein incorporated by reference.

The geometric, superficial, or apparent surface area of the skeletal or honeycomb type supports, including the walls of the gas flow channels is generally about 0.5 to 6, and preferably 1 to 5, square meters per liter of support. This surface area is sufficient for deposition of a satisfactory quantity of the composite or the finished catalyst composition. The plurality of channels, about 100 to 2500, preferably 150 to 500 per square inch of cross-sectional area, may be distributed across the entire face of the structure and frequently they define an open area in excess of 60 percent of the total area of the support. The walls must be thick enough to provide rigidity and integrity to the structure while maintaining good apparent surface area. The wall thickness is thus in the range of about 2 to 25 mils. The flow channels can be of any shape and size consistent with the desired superficial surface area and should be large enough to permit relatively free passage of the gaseous reaction mixture; preferably the length of the channels is at least about 0.1 inch to insure sufficient contact or residence time to cause the desired reaction. Although the channels are generally parallel, they may be multi-directional and may communicate with one or more adjacent channels.

In one manner of preparing structures provided with catalyst compositions of this invention, an aqueous slurry of the essentially water insoluble calcined composite of alumina and stabilizing component is contacted with the support. The solids content of the slurry forms an adherent deposit on the support, and the resulting supported composite is dried or calcined for a second time at a temperature which provides a relatively catalytically-active product. The second drying or calcination takes place at a temperature low enough to prevent undue sintering of the mixture. Suitable calcination temperatures are generally about 300°–700°C. to insure catalytic activity without undue sintering, preferably about 400°–600°C. After this second calcination the coating on the support has a surface area of at least about 75 s.m.p.g. Lower temperatures can be employed to dry the composite if the second calcination is not performed.

After the coated support is dried or calcined, a platinum group metal component is added to enhance the catalytic activity of the composite. The platinum group metal may be added to the coated support in the manner previously described. Preferably, this addition is made from an aqueous or other solution to impregnate or deposit the platinum group metal component on the coated support.

After addition of the platinum group metal, the resulting structure is dried and may be calcined for a third time under conditions which provide a composition having characteristics that enhance selected reactions. This final calcination stabilizes the completed catalyst composition so that during the initial stages of use, the activity of the catalyst is not materially altered. The temperature of this final calcination must be low enough to prevent substantial sintering of the underlying coating which would cause substantial occlusion of the platinum group metal component. Thus the calcination may be conducted at temperatures of about 300°–700°C., preferably about 400°–600°C.

An alternative method of making the catalyst compositions of this invention if a relatively inert support is used involves adding the platinum group metal component to the calcined composite before the composite is deposited on the support. For example, an aqueous slurry of the calcined composite can be prepared and the platinum group metal component added to the slurry and mixed intimately therewith. The platinum group metal component can be in the form already described and may be precipitated as previously described. The final mixture containing the platinum group metal may then be dried or calcined to provide a catalytically-active composition in a form suitable for deposition on a support or for use without such deposition as a finished catalyst in either finely divided or macrosize forms. Subsequent calcinations or drying may be conducted as described above. The calcined material generally has a surface area of at least about 25 s.m.p.g., preferably at least about 75 s.m.p.g.

The following are examples of the general method of preparation of some representative stabilized catalytic composites and compositions of this invention. All percentages, parts, and proportions herein and in the appended claims are by weight unless otherwise indicated.

EXAMPLE I

A stabilized $SiO_2$, $Cr_2O_3$, SrO and $Al_2O_3$ composite is prepared. 15.0 grams of Ludox LS colloidal silica sol are diluted to 45 cc. 3.95 grams of $CrO_3$ (chromic acid) and 3.06 grams strontium nitrate are dissolved in the solution and diluted to form a total volume of 80.3 ml. 51 grams of activated $Al_2O_3$ powder is stirred into the solution with constant agitation for 10 minutes. The total solution is then evaporated to dryness under heat and with agitation, transferred to a drying oven at 110°C., and dried overnight. The dried solids are then crushed to powder. Five grams of the composite containing 7.5 percent $SiO_2$, 5 percent chromia, 2.5 percent strontia, and 85 percent alumina is then tested for retention of surface area by calcining at 1200°C. for 4 hours. It is found that the surface area after such calcination is 48.2 m²/g.

EXAMPLE II

A stabilized SnO, $Cr_2O_3$, SrO, and $Al_2O_3$ composite is prepared. 7.55 grams of stannous chloride are dissolved in 20 ml. of water containing 1 ml. of conc. HCl, 3.95 grams of $CrO_3$ (chromic acid) and 3.07 grams strontium nitrate are dissolved. The solution is diluted with $H_2O$ to form a total volume of 80.3 ml. 51 grams of activated $Al_2O_3$ powder is stirred into the solution with constant agitation for 10 minutes. The total solution is then evaporated to dryness under heat and with agitation, transferred to a drying oven at 110°C., and dried overnight. The dried solids are then crushed to powder. Five grams of the composite containing 7.5% SnO, 5% chromia, 2.5% strontia, and 85% alumina is then tested for retention of surface area by calcining at 1200°C. for 4 hours. It is found that the surface area after such calcination is 49.7 m²/g.

EXAMPLE III

A composite is prepared containing SnO, chromia, baria, and alumina. 38.34 grams of $Ba(NO_3)_2$ is dissolved in water by warming to 55°C. This solution is then diluted to 400 ml. and 255 grams of commercial alumina having a surface area of about 300 m²/g is added to the barium solution. The slurry is mixed for about 5 minutes dried for 1 hour with heat, transferred to an oven and dried at 110°C. 303 grams are recovered and this is crushed to powder. This powder is set aside for further preparation. 2.52 grams of stannous chloride is dissolved in 20 ml. of water containing 1 ml. conc. HCl. 3.95 grams of $CrO_3$ are dissolved in the solution and diluted to 70 ml. 61 grams of admixture A, i.e., the alumina-baria admixture, is added to the solution with agitation for 5 minutes. The slurry is transferred to an evaporating dish, dried with agitation for one hour under an infrared lamp, transferred to an oven and dried at 110°C. overnight. The dried mixture contains 2.5 percent by weight SnO, 5 percent by weight chromia, 7.5 percent by weight baria, and 85 percent by weight alumina. The mixture is crushed to a powder and a portion is calcined at 1200°C. for four hours. The surface area of the calcined powder is 67.7 m$^2$/g.

EXAMPLE IV

A composite is prepared containing CaO, chromia, baria, and alumina. 25.57 grams of Ba(NO$_3$)$_2$ is dissolved in water by warming to 55°C. This solution is then diluted to 400 ml. and 255 grams of commercial alumina having a surface area of about 300 m$^2$/g is added to the barium solution. The slurry is mixed for about 5 minutes, dired for 1 hour with heat, transferred to an oven and dried overnight at 110°C. 291 grams are recovered and this is crushed to powder. This powder is set aside for further preparations. 12.63 grams of calcium nitrate and 3.95 grams of CrO$_3$ are dissolved in water and diluted to 70 ml. 58.2 grams of admixture B, i.e., the alumina-baria admixture, is added to the solution with agitation for 5 minutes. The slurry is transferred to an evaporating dish, dried with agitation for one hour under an infrared lamp, transferred to an oven and dried at 110°C. overnight. The dried mixture contains 5 percent by weight CaO, 5 percent by weight chromia, 5 percent by weight baria, and 85 percent by weight alumina. The mixture is crushed to a powder and a portion is calcined at 1200°C. for four hours. The surface area of the calcined powder is 26.6 m$^2$/g.

EXAMPLE V

A composite is prepared containing strontia-chromia-alumina. 12.25 grams of strontium nitrate, and 3.95 grams of CrO$_3$ (chromic acid) are dissolved in 80 ml. of H$_2$O. 51 grams of alumina is added to the solution with constant agitation for 10 minutes. The slurry is then evaporated to dryness with heat and agitation, transferred to a drying oven at 110°C., and then dried overnight. The dried solids containing 10% strontia, 5% chromia, and 85% alumina is then calcined for 4 hours at 1200°C. It is found that the surface area after such calcination is 27.0 m$^2$/g.

EXAMPLE VI

A composite is prepared containing SnO chromia-alumina. 10.05 grams of stannous chloride are dissolved in 20 ml. of water containing 1 ml. of conc. HCl. 3.95 grams of CrO$_3$ (chromic acid) are dissolved and the total diluted to 80 ml. 51 grams of alumina is added to the solution with constant agitation for 10 minutes. The slurry is then evaporated to dryness with heat and agitation, transferred to a drying oven at 110°C., and then dried overnight. The dried solids containing 10% SnO, 5% chromia, and 85% alumina is then calcined for 4 hours at 1200°C. It is found that the surface area after such calcination is 24.5 m$^2$/g.

EXAMPLE VII

A composite is prepared containing zirconia, chromia, baria, and alumina, 12.78 grams of Ba(NO$_3$)$_2$ is dissolved in water by warming to 55°C. This solution is then diluted to 400 ml. and 255 grams of commercial alumina having a surface area of about 300 m$^2$/g is added to the barium solution. The slurry is mixed for about 5 minutes dried for 1 hour with heat, transferred to an oven and dried overnight at 110°C. The solids are recovered and this is crushed to powder. This powder is set aside for further preparations. 9.18 grams of zirconyl nitrate and 3.95 grams of CrO$_3$ are dissolved in water and diluted to 70 ml. 55.40 grams of the barium-alumina admixture are added to the solution and the slurry is mixed for 5 minutes. The slurry is then evaporated to dryness with heat and agitation, transferred to a drying oven at 110°C. and dried overnight. The dried solids containing 5 percent Cr$_2$O$_3$, 2 percent BaO, 7.5 percent ZrO$_2$, and 85 percent Al$_2$O$_3$ are ground to a powder. A portion of the powder is then calcined at 1200°C. for 4 hours. It is found that the surface area after such calcination is 44.3 m$^2$/g.

EXAMPLE VIII

A composite is prepared by coprecipitation. The composition is 2.5 percent SnO, 5 percent chromia, 7.5 percent baria, and 85 percent alumina. 187.7 grams of aluminum nitrate, 3.83 grams of barium nitrate, and a solution of 1.26 grams stannous chloride in 45 ml. H$_2$O and 5 ml. conc. HCl are added in series to one liter of water and the solution transferred to a dropping funnel. A second solution is prepared by dissolving 7.90 grams chromium nitrate in 1000 ml. H$_2$O. This solution is also added to a dropping funnel. A third solution is prepared containing 400 ml. of ammonium hydroxide (28.3% NH$_3$) and 1600 ml. water and transferred to a dropping funnel. 2000 ml. of water is added to a 6 liter beaker with vigorous mechanical stirring. Both of the nitrate solutions are then added at room temperature to the water in the beaker over a period of 30 minutes. The ammonia solution is added concurrently with the nitrate solution at such a rate as to keep the pH of the slurry in the beaker at 9.0. Stirring is continued for 15 minutes after the coprecipitation is complete. The slurry is allowed to stand overnight and then filtered and re-slurried in 2 liters of water. The second slurry is filtered, excess water removed, and dried for four days at room temperature. The filter cake is hand ground to a powder, dried for 1 day at room temperature, and overnight at 110°C. The surface area is good for calcination at 1200°C. for 2 hours.

EXAMPLE IX

A two kilogram batch of composite is prepared exactly as in EXAMPLE I. 500 grams of Ludox LS is diluted to 1500 ml. 102.1 grams of strontium nitrate and 131.6 grams of chromic acid are added and the total is diluted to 2000 ml. 1700 grams of alumina are added together with 246 ml. of water. The slurry is stirred in a Ross mixer for ½ hour at room temperature, dried on a steam bath with intermittent mixing and the recovered solids are dried overnight in an oven at 110°C. The dried solids crushed by hand and mechanically pulverized. The powder is then calcined at about 750°C. for 4 hours. 120 grams of the calcined powder thus prepared are mixed with 211.5 ml. H$_2$O and 13.5 ml. conc. HNO$_3$, and ball-milled overnight in a 2-quart mill jar, resulting in a slip having a viscosity of 42.5 cps, a pH of 3.50 and a density of 1.41 g/ml. The resulting slip is diluted with 1% nitric acid to a viscosity of about 13 cps. A 1 × 3 inches zircon mullite honeycomb having about 440 channels per square inch of cross-sectional area is dipped into this diluted slip for 1 minute, drained, blown with air, dried at 110°C. for 2½ hours, and calcined at 500°C. for 2 hours. The adherent composite is about 13% by weight of the total coated honeycomb.

EXAMPLE X

A honeycomb, coated with the silica-chromia-strontia-alumina composite slip is prepared as in EXAMPLE IX. The coated honeycomb is then dipped into about 51 ml. of a solution containing 18 grams of $Na_2PdCl_4$. After standing for 15 minutes with intermittent raising and lowering of the honeycomb into the solution, the honeycomb is withdrawn from the solution, drained, and excess solution blown off. The coated honeycomb is then treated with sodium bicarbonate for one hour at room temperature and heated at 55°C. for 15 minutes, bicarbonate blown off, and washed chloride-free using deionized water. The honeycomb is then returned to the palladium solution and immersed as before and again treated with bicarbonate, the excess blown off and washed chloride-free. The resulting impregnated honeycomb is dried overnight at 110°C. The finished catalyst contains 1.54% PdO based on weight pickup.

Representative compositions prepared by the same methods as set forth in the Examples and results obtained after calcination at 1200°C. are reported in TABLE I.

ignition temperature of the fuel-air admixture but below a temperature that would result in any substantial formation of oxides of nitrogen.

Flammable mixtures of most fuels with air are normally such as to burn at relatively high temperatures, i.e., about 3300°F. and above, which inherently results in the formation of substantial amounts of nitrogen oxides or $NO_x$. However, little or no $NO_x$ is formed in a system which burns the fuel catalytically at relatively low temperatures.

For a true catalytic oxidation reaction, one can plot temperature against rate of reaction. For any given catalyst and set of reaction conditions, as the temperature is initially increased, the reaction rate is also increased. This rate of increase is exponential with temperature. As the temperature is raised further, the reaction rate then passes through a transition zone where the limiting parameters determining reaction rate shift from catalytic to mass transfer. When the catalytic rate increases to such an extent that the reactants cannot be transferred to the catalytic surface fast enough to keep up with the catalytic reaction rate, the reaction shifts to mass transfer control, and the observed reaction rate changes much less with further temperature increases. The reaction is then said to be mass transfer limited. In mass transfer controlled catalytic reactions, one cannot distinguish between a more active catalyst and a less active catalyst because the intrinsic catalyst activity is

TABLE I

| | | Composite Surface Areas % Chemical Composition | | | | Final Calcination at 1200°C. | |
|---|---|---|---|---|---|---|---|
| No. | % $Al_2O_3$ | IIA | IVA | IVB | VIB (Chromia) | Time hrs. | Surface Area $m^2/g$ |
| 1 | 100 | — | — | | — | 4 | 8 |
| 2 | 85 | 5% CaO | 5% $SiO_2$ | | 5% | 4 | 20.1 |
| 3 | 85 | 1.5% SrO | 8.5% $SiO_2$ | | 5% | 4 | 43.5 |
| 4 | 85 | 2.5% SrO | 7.5% $SiO_2$ | | 5% | 4 | 48.2 |
| 5 | 85 | 7.5% SrO | 2.5% $SiO_2$ | | 5% | 4 | 36.4 |
| 6 | 80 | 2.5% SrO | 7.5% $SiO_2$ | | 10% | 4 | 37.6 |
| 7 | 85 | 2.5% SrO | 7.5% SnO | | 5% | 4 | 49.7 |
| 8 | 85 | 7.5% SrO | 2.5% $SnO_2$ | | 5% | 4 | 36.7 |
| 9 | 85 | 5% BaO | 5% $SiO_2$ | | 5% | 4 | 50.6 |
| 10 | 85 | 7.5% BaO | 2.5% SnO | | 5% | 4 | 67.7 |
| 11 | 85 | 5% BaO 2.5% SrO | 2.5% $SiO_2$ | | 5% | 4 | 32.2 |
| 12 | 85 | 10% SrO | | | 5% | 4 | 27.0 |
| 13 | 85 | 10% BaO | | | 5% | 4 | 25.1 |
| 14 | 85 | 5% BaO 5% CaO | | | 5% | 4 | 26.6 |
| 15 | 85 | 5% BaO 5% SrO | | | 5% | 4 | 21.4 |
| 16 | 85 | | 10% $SiO_2$ | | 5% $Cr_2O_3$ | 4 | 21.3 |
| 17 | 85 | | 10% SnO | | 5% $Cr_2O_3$ | 4 | 24.5 |
| 18 | 85 | 5% SrO | | 5% $ZrO_2$ | 5% | 4 | 34.0 |
| 19 | 85 | 2.5% BaO | | 7.5% $ZrO_2$ | 5% | 4 | 44.3 |
| 20 | 85 | 7.5% BaO | | 2.5% $ZrO_2$ | 5% | 4 | 30.3 |
| 21 | 85 | 5% $SiO_2$ | | 5% $ZrO_2$ | 5% | 4 | 24.0 |
| 22 | 85 | 5% SnO | | 5% $ZrO_2$ | 5% | 4 | 21.3 |

In the practice of this invention the catalytic compositions are particularly useful when employed with the high temperature oxidation of carbonaceous fuels. For example they may be used advantageously in a method employing a catalytically-supported thermal combustion of carbonaceous fuel, as more fully described in co-pending application Ser. No. 358,411, filed May 8, 1973, of W. C. Pfefferle, assigned to the assignee hereof and which application is incorporated by reference herein. This method includes the essentially adiabatic combustion of at least a portion of a carbonaceous fuel admixed with air in the presence of a catalytic composition of this invention at an operating temperature substantially above the instantaneous autonot determinative of the rate of reaction. Regardless of any increase in catalytic activity above that required for mass transfer control, a greater catalytic conversion rate cannot be achieved for the same set of conditions.

It has been discovered that it is possible to achieve essentially adiabatic combustion in the presence of a catalyst at a reaction rate many times greater than the mass transfer limited rate. That is, catalytically-supported, thermal combustion surmounts the mass transfer limitation. If the operating temperature of the catalyst is increased substantially into the mass transfer limited region, the reaction rate again begins to increase exponentially with temperature. This is an apparent contradiction of catalytic technology and the laws of mass transfer kinetics. The phenomena may be explained by the fact that the catalyst surface and the gas layer near the catalyst surface are above a temperature at which thermal combustion occurs at a rate higher than the catalytic rate, and the temperature of the catalyst surface is above the instantaneous auto-ignition temperature of the fuel-air admixture (defined hereinbelow). The fuel molecules entering this layer spontaneously burn without transport to the catalyst surface. As combustion progresses, it is believed that the layer becomes deeper. The total gas is ultimately raised to a temperature at which thermal reactions occur in the entire gas stream rather than only near the surface of the catalyst. At this point, the thermal reactions continue even without further contact of the gas with the catalyst as the gas passes through the combustion zone.

The term "instantaneous auto-ignition temperature" for a fuel-air admixture as used herein and in the appended claims is defined to mean that the ignition lag of the fuel-air mixture entering the catalyst is negligible relative to the residence time in the combustion zone of the mixture undergoing combustion.

This method can employ an amount of fuel equivalent in heating value of about 300–1000 pounds of propane per hour per cubic foot of catalyst. There is no necessity of maintaining fuel-to-air ratios in the flammable range, and consequently loss of combustion (flame-out) due to variations in the fuel-to-air ratio is not as serious a problem as it is in conventional combustors.

The adiabatic flame temperature of fuel-air admixtures at any set of conditions (e.g., initial temperature and, to a lesser extent, pressure) is established by the ratio of fuel to air. The admixtures utilized are generally within the inflammable range or are fuel-lean outside of the inflammable range, but there may be instances of a fuel-air admixture having no clearly defined inflammable range but nevertheless having a theoretical adiabatic flame temperature within the operating conditions of the invention. The proportions of the fuel and air charged to the combustion zone are typically such that there is a stoichiometric excess of oxygen based on complete conversion of the fuel to carbon dioxide and water. Preferably, the free oxygen content is at least about 1.5 times the stoichiometric amount needed for complete combustion of the fuel. Although the method is described with particularity to air as the non-fuel component, it is well understood that oxygen is the required element to support proper combustion. Where desired, the oxygen content of the non-fuel component can be varied and the term "air" as used herein refers to the non-fuel components of the admixtures. The fuel-air admixture fed to the combustion zone may have as low as 10 percent free oxygen by volume or less, which may occur, for example, upon utilization as a source of oxygen of a waste stream wherein a portion of this oxygen has been reacted. In turbine operations, the weight ratio of air to fuel charged to the combustion system is often above about 30:1 and some turbines are designed for air-to-fuel ratios of up to about 200 or more:1.

The carbonaceous fuels may be gaseous or liquid at normal temperature and pressure. Suitable hydrocarbon fuels may include, for example, low molecular weight aliphatic hydrocarbons such as methane, ethane, propane, butane, pentane; gasoline; aromatic hydrocarbons such as benzene, toluene, ethylbenzene, xylene; naphtha; diesel fuel; jet fuel; other middle distillate fuels; hydrotreated heavier fuels; and the like. Among the other useful carbonaceous fuels are alcohols such as methanol, ethanol, isopropanol; ethers such as diethylether and aromatic ethers such as ethylphenyl ether; and carbon monoxide. In burning diluted fuels containing inerts, for example, low BTU coal gas, fuel-air admixture with adiabatic flame temperatures within the range specified herein may be either fuel rich or fuel lean. Where fuel rich mixtures are utilized, additional air or fuel-air admixture may be added to the catalyst zone effluent to provide an overall excess of air for complete combustion of fuel components to carbon dioxide and water. As stated previously, thermal reactions continue beyond the catalyst zone, provided the effluent temperature is substantially above the instantaneous auto-ignition temperature.

The fuel-air admixture is generally passed to the catalyst in the combustion zone at a gas velocity prior to or at the inlet to the catalyst in excess of the maximum flame propagating velocity. This may be accomplished by increasing the air flow or by proper design of the inlet to a combustion chamber, e.g., restricting the size of the orifice. This avoids flashback that causes the formation of $NO_x$. Preferably, this velocity is maintained adjacent to the catalyst inlet. Suitable linear gas velocities are usually above about three feet per second, but it should be understood that considerably higher velocities may be required depending upon such factors as temperature, pressure, and composition. At least a significant portion of the combustion occurs in the catalytic zone and may be essentially flameless.

The carbonaceous fuel, which when burned with a stoichiometric amount of air (atmospheric composition) at the combustion inlet temperature usually has an adiabatic flame temperature of at least about 3300°F., is combusted essentially adiabatically in the catalyst zone. Although the instantaneous auto-ignition temperature of a typical fuel may be below about 2000°F., stable, adiabatic combustion of the fuel below about 3300°F. is extremely difficult to achieve in practical primary combustion systems. It is for this reason that even with gas turbines limited to operating temperatures of 2000°F., the primary combustion is typically at temperatures in excess of 4000°F. As stated above, combustion in this method is characterized by using a fuel-air admixture, having an adiabatic flame temperature substantially above the instantaneous auto-ignition temperature of the admixture but below a temperature that would result in any substantial formation of $NO_x$. The limits of this adiabatic flame temperature are governed largely by residence time and pressure. Generally, adiabatic flame temperatures of the admixtures are in the range of about 1700°F. to 3200°F., and preferably are about 2000°F. to 3000°F. Operating at a temperature much in excess of 3200°F. results in the significant formation of $NO_x$ even at short contact times; this derogates from the advantages of this invention vis-a-vis a conventional thermal system. A higher temperature within the defined range is desirable, however, because the system will require less catalyst and thermal reactions are an order of magnitude or more faster, but the adiabatic flame temperature employed can depend on such factors as the desired composition of the effluent and the overall design of the system. It thus will be observed that a fuel which would ordinarily burn at such a high temperature as to form $NO_x$ is successfully combusted within the defined temperature range without significant formation of $NO_x$.

The catalyst used in this method generally operates at a temperature approximating the theoretical adiabatic flame temperature of the fuel-air admixture charged to the combustion zone. The entire catalyst may not be at these temperatures, but preferably a major portion or essentially all, of the catalyst surface is at such operating temperatures. These temperatures are usually in the range of about 1700°–3200°F., preferably about 2000°F. to about 3000°F. The temperature of the catalyst zone is controlled by controlling the combustion of the fuel-air admixture, i.e., adiabatic flame temperature, as well as the uniformity of the mixture. Relatively higher energy fuels can be admixed with larger amounts of air in order to maintain the desired temperature in a combustion zone. At the higher end of the temperature range, shorter residence times of the gas in the combustion zone appear to be desirable in order to lessen the chance of forming $NO_x$.

The residence time is governed largely by temperature, pressure, and space throughput; and generally is measured in milliseconds. The residence time of the gases in the catalytic combustion zone and any subsequent thermal combustion zone may be below about 0.1 second, preferably below about 0.05 second. The gas space velocity may often be, for example, in the range of about 0.5 to 10 or more million cubic feet of total gas (standard temperature and pressure) per cubic foot of total combustion zone per hour. For a stationary turbine burning diesel fuel, typical residence times could be about 30 milliseconds or less; whereas in an automotive turbine engine burning gasoline, the typical residence time may be about 5 milliseconds or less. The total residence time in the combustion system should be sufficient to provide essentially complete combustion of the fuel, but not so long as to result in the formation of $NO_x$.

A method employing the catalyst of the present invention is exemplified in a series of runs in which the fuel is essentially completely combusted, and a low emissions effluent produced. The combustion system comprises a source of preheated air supplied under pressure. A portion of the air is passed through a pipe to the combustion zone, and the remainder is used to cool and dilute the combustion effluent. Unleaded gasoline fuel is atomized into the air passing to the combustion zone countercurrent to the air flow to insure intimate mixing.

The catalyst used is of the monolithic, honeycomb-type having a nominal 6-inch diameter and is disposed within a metal housing as two separate pieces each having parallel flow channels 2¼ inches in length extending therethrough. There is a small space of about ¼ inch between these pieces. Both pieces of catalyst have approximately 100 flow channels per square inch of cross-section with the walls of the channels having a thickness of 10 mils. The catalysts have similar compositions and are composed of a zircon mullite honeycomb support which carries a composite coating of 85% alumina, 5% chromia, 2.5% strontia, and 7.5% silica containing palladium made in a manner similar to EXAMPLE X.

Provision is made for contacting the fuel mixed with a portion of the total air stream with the catalyst. That portion of the total air stream not mixed with the fuel is added to the combustion effluent immediately upon its exit from the catalyst zone. This dilution or secondary air cools the combustion effluent and samples of the mixture are taken for analysis. Thermocouples are located adjacent the initial catalyst inlet and at the sampling position to detect the temperatures of these locations.

The catalysts are brought to reaction temperature by contact with preheated air, and subsequent contact with the air-fuel mixture which causes combustion and raised the catalyst temperature further. The results obtained using this system are good and low amounts of pollutants are present in the emission.

The catalysts of this invention can also be used for selected oxidation reactions at lower temperatures. In a typical oxidation they can be employed to promote the reaction of various chemical feedstocks by contacting the feedstock or compound with the catalyst in the presence of free oxygen preferably molecular oxygen. Although some oxidation reactions may occur at relatively low temperatures, many are conducted at elevated temperatures of about 150°C. to 900°C., and generally, these reactions occur with the feedstock in the vapor phase. The feeds generally are materials which are subject to oxidation and contain carbon, and may, therefore, be termed carbonaceous, whether they are organic or inorganic in character. The catalysts of this invention are particularly useful in promoting the oxidation of hydrocarbons, oxygen-containing organic components, for example, aldehydes, organic acids, and other intermediate products of combustion, such as carbon monoxide, and the like. These materials are frequently present in exhaust gases from the combustion of carbonaceous fuels, and thus the catalysts of the present invention are particularly useful in promoting the oxidation of such materials thereby purifying the exhaust gases. Such oxidation can be accomplished by contacting the gas stream with the catalyst and molecular or free oxygen. The oxygen may be present in the gas stream as part of the effluent, or may be added as air or in some other desired form having a greater or lesser oxygen concentration. The products from such oxidation contain a greater weight ratio of oxygen to carbon than in the material subjected to oxidation and in the case of exhaust purification these final oxidation products are much less harmful than the partially oxidized materials. Many such reaction systems are known in the art.

What is claimed is:

1. A catalyst composition consisting essentially of (a) a catalytically-active, calcined composite of alumina; a first metal oxide component selected from the group consisting of an oxide of chromium, tungsten, and mixtures thereof; and a second metal oxide component selected from the group consisting of an oxide of (i) a metal selected from the group consisting of calcium, strontium, barium, silicon, tin, and mixtures thereof and (ii) mixtures of zirconium with a metal selected from the group consisting of calcium, strontium, barium, silicon, tin, and mixtures thereof, said composite having been formed by calcination at a temperature of at least 500°C. and possessing a surface area of at least 20 $m^2/g$ when calcined for 2 hours at 1200°C.; and (b) a catalytically-effective amount of a platinum group metal incorporated in said calcined composite after calcination of said composite at a temperature of at least 500°C.

2. A composition as defined in claim 1 wherein said composite contains about 80 to 95 weight percent of said alumina, about 2 to 15 weight percent of said first metal oxide component and about 2 to 15 weight percent of said second metal oxide component.

3. A catalyst composition as defined in claim 1 wherein said composite contains about 80 to 95 weight percent of alumina, about 2 to 15 weight percent of said first metal oxide component and about 2 to 15 weight percent of said second metal oxide component, and wherein said first metal oxide component is chromia and wherein said second metal oxide component is a mixture of BaO and SnO.

4. A composition as defined in claim 1 wherein said platinum group metal is present in an amount of about 0.1 to 20 percent by weight of said composite and is selected from the group consisting of platinum, palladium, platinum-palladium alloys, and mixtures thereof.

5. A composition as defined in claim 1 wherein said composite is pellet-form.

6. A catalyst composition consisting essentially of (a) an inert support and deposited on said support (b) a catalytically-active calcined composite of alumina; a first metal oxide component selected from the group consisting of an oxide of chromium, tungsten and mixtures thereof; and a second metal oxide component selected from the group consisting of an oxide of (i) a metal selected from the group consisting of calcium, strontium, barium, silicon, tin and mixtures thereof and (ii) mixtures of zirconium with a metal selected from the group consisting of calcium, strontium, barium, silicon, tin, and mixtues thereof, said composite having been formed by calcination at a temperature of at least 500°C. before being deposited on said support and possessing a surface area of at least 20 m$^2$/g when calcined for 2 hours at 1200°C. and (c) a catalytically-effective amount of a platinum group metal incorporated in said composite after said composite has been calcined at a temperature of at least 500°C. and after said composite has been deposited on said inert support.

7. A catalyst composition as defined in claim 6 wherein said support is pellet-form.

8. A catalyst composition as defined in claim 6 wherein said support is a ceramic honeycomb.

9. A catalyst composition as defined in claim 6 wherein said platinum group metal is present in an amount of about 0.2 to 10 percent by weight of said composite and wherein said platinum group metal is selected from the group consisting of platinum, palladium, platinum-palladium alloys, and mixtures thereof.

10. A catalyst composition as defined in claim 6 wherein said composite contains about 80 to 95 weight percent of said alumina, about 2 to 15 weight percent of said first metal oxide component, and about 2 to 15 weight percent of said second metal oxide component.

11. A catalyst composition as defined in claim 6 wherein said first metal oxide component is chromia and wherein said second metal oxide component is a mixture of BaO and SnO.

12. A method for the preparation of a catalyst composition, comprising: (a) forming an intimate admixture consisting essentially of an alumina-producing aluminum compound, and of two metal compound components which upon calcining yield the corresponding metal oxides wherein the first of said metal compound components is selected from the group consisting of a compound of chromium, tungsten, and mixtures thereof and the second of said metal compound components is selected from the group consisting of a compound of (i) a metal selected from the group consisting of calcium, strontium, barium, silicon, tin, and mixtures thereof and (ii) mixtures of zirconium with a metal selected from the group consisting of calcium, strontium, barium, silicon, tin, and mixtures thereof; (b) calcining said intimate admixture at a temperature of at least 500°C to form a resulting calcined composite containing alumina and the aforesaid metal oxides, and possessing a surface area of at least 20 m$^2$/g when calcined for two hours at 1200°C; and (c) incorporating a catalytically-effective amount of a platinum group metal in said calcined composite.

13. A method as defined in claim 12 wherein said aluminum compound is alumina.

14. A method as defined in claim 12 further comprising depositing said composite on a relatively inert substrate to form a coating thereon prior to step (c).

15. A method as defined in claim 12 further comprising forming said intimate admixture into pellets before calcining.

16. A method as defined in claim 12 further comprising depositing said catalyst composition on a relatively inert substrate to form a coating after step (c).

17. A method as defined in claim 12 wherein the metal of said first metal compound component is chromium and the metal of said second metal compound component is a mixture of barium and tin.

18. A method as defined in claim 12 wherein said intimate admixture is formed by coprecipitation of said compounds from an aqueous solution thereof.

19. A catalyst composite in accordance with claim 1 wherein said composite is formed by calcining at a temperature of 1200°C.

20. A method in accordance with claim 12 wherein said intimate admixture is calcined at a temperature of 1200°C.

* * * * *